United States Patent [19]

Ramsey, Jr.

[11] Patent Number: 4,669,506
[45] Date of Patent: Jun. 2, 1987

[54] RESILIENT DOMED PARTITION

[75] Inventor: Robert W. Ramsey, Jr., Damascus, Md.

[73] Assignee: Nuclear Energy Systems, Inc., Danbury, Conn.

[21] Appl. No.: 826,356

[22] Filed: Feb. 5, 1986

[51] Int. Cl.$^4$ .................. F16L 55/10; B30B 15/00
[52] U.S. Cl. ................................ 138/89; 100/181
[58] Field of Search ............... 53/523, 526, 527; 100/35, 180, 181, 184, 215, 295; 138/89, 92, 94; 141/12, 73, 80; 217/123, 124

[56] References Cited

U.S. PATENT DOCUMENTS

| 128,036 | 6/1872 | Graham | 217/123 |
| 872,614 | 12/1907 | East | 217/124 X |
| 1,897,366 | 2/1933 | Durand | 217/123 X |
| 4,564,469 | 1/1986 | Cochet et al. | 100/181 X |

FOREIGN PATENT DOCUMENTS 344790 3/1931 United Kingdom ............... 217/123

Primary Examiner—Stephen Marcus
Assistant Examiner—Mark Thronson
Attorney, Agent, or Firm—Charles J. Brown

[57] ABSTRACT

A resilient transverse partition for a substantially cylindrical body such as a drum or a pipe, wherein a plurality of narrow elongated leaves of thin resilient material and equal length are co-joined in an overlapping fanned array about a common center with their ends slideable with respect to one another and congruent with a circle of slightly greater diameter than said body, so that the array of leaves can be forced into the body transversely and coaxially therewithin and deformed into a concavo-convex domes partition resilient to axial displacement from forces acting on its convex side.

17 Claims, 8 Drawing Figures

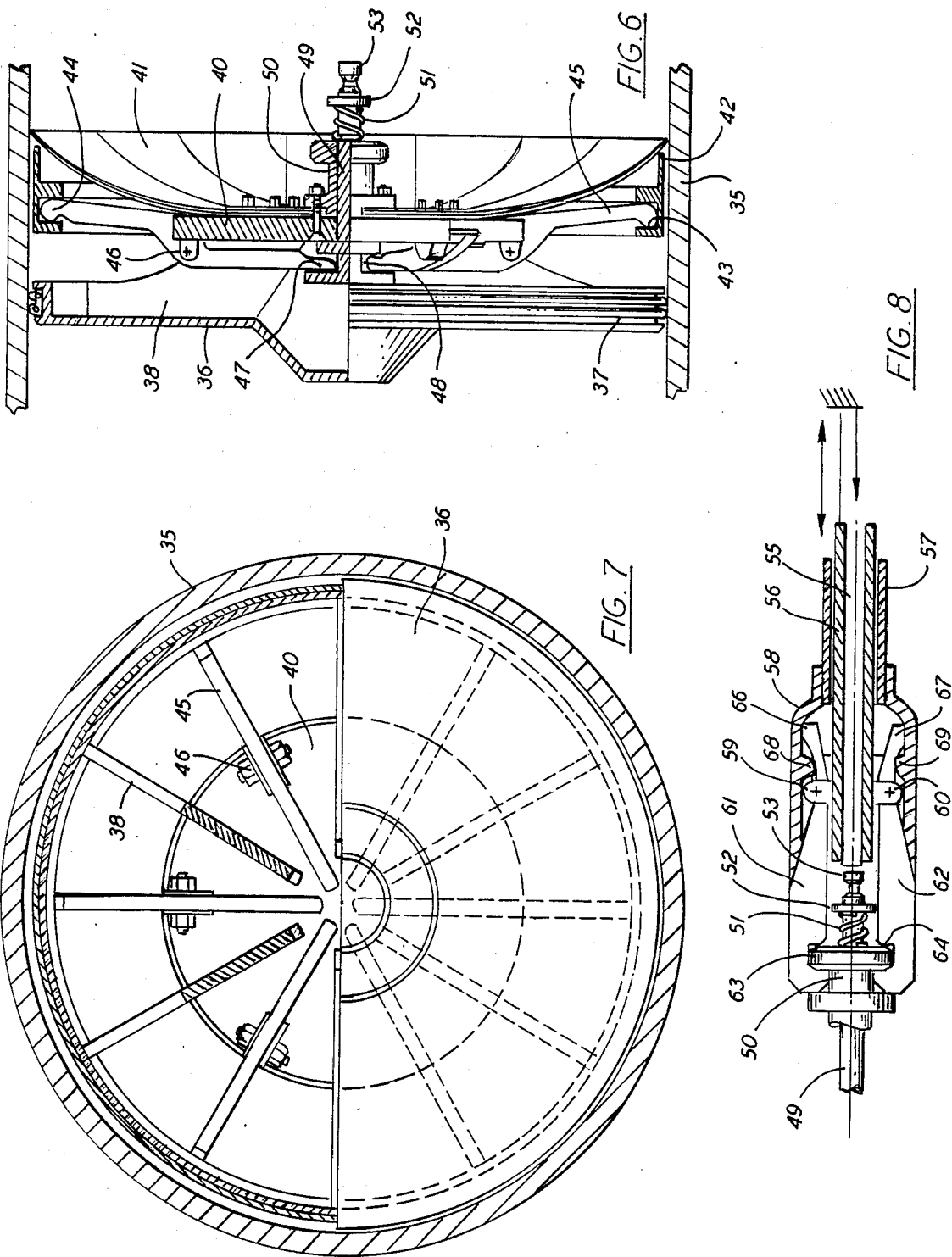

RESILIENT DOMED PARTITION

BACKGROUND OF THE INVENTION

It is the principal purpose of this invention to provide a partition, bulkhead or circular closure which forms a concavoconvex or domed configuration with its convex side adapted to face in the direction from which displacement forces are to be expected, in such a way that an increase in the displacement forces causes the partition to be wedged more securely in place. Circular domed partitions are known in the prior art as represented by U.S. Pat. Nos. 2,720,893 and 2,139,491 and domed partitions of that general configuration have been used in temporary pipeline seals as in U.S. Pat. No. 4,335,757. Compacting devices also employ discs to be forced into place within containers against compressible contents, such as in U.S. Pat. No. 4,462,310, though in that instance the discs are flat rather than concavo-convex.

The object of the present invention is to improve upon domed partitions and closures of the prior art and provide a new design useful in pipeline seals, compacting devices and other situations where a substantially cylindrical body requires a transverse partition.

BRIEF STATEMENT OF THE INVENTION

The resilient transverse partition of the invention, adapted for use in a substantially cylindrical body, comprises a plurality of narrow elongated leaves of thin resilient material of equal length co-joined in an overlapping fanned array about a common center with their opposite ends slideable with respect to one another and congruent with a circle of slightly greater diameter than that of the body. The array of leaves is adapted to be forced into the body transversely and coaxially therewithin and deformed into a concavo-convex domed partition resistant to axial displacement from forces acting on its convex side.

In its preferred form the leaves are fanned apart with equal angular displacement therebetween and with the corners of the leaves substantially congruent. This is preferably achieved by dimensioning each leaf so that its width is substantially equal to Pi times its length divided by twice the number of leaves. The opposite ends of the leaves may be straight or so segmented that only their corner portions contact the cylindrical body or they may be arcuate and conform substantially to and contact the cylindrical body throughout their length. The leaves are preferably made of thin sheet metal.

An important characteristic of the domed partition of the invention is that at its periphery it has a thickness equal to that of one of the leaves but at its center its thickness is the total of all of the leaves, with concentric symmetrical gradations of thickness inbetween. This is precisely what is needed because the partition should be most flexible at its periphery where it engages the cylindrical body and least flexible at its center where the buckling effect of the displacement forces is greatest.

DESCRIPTION OF THE DRAWINGS

FIG. 6 is an elevation partly in section of a temporary pipeline seal assembly part of which is a resilient transverse partition according to the invention equipped with a bending ring form of removal means;

FIG. 7 is an end elevation of the seal of FIG. 6 partly in section of the convex side of the domed partition; and FIG. 8 is an enlarged elevation partly in section illustrating a grapple device for operating the bending ring and removing the seal of FIGS. 6 and 7 from within the pipeline.

DESCRIPTION OF PREFERRED EMBODIMENT

Figure 2:
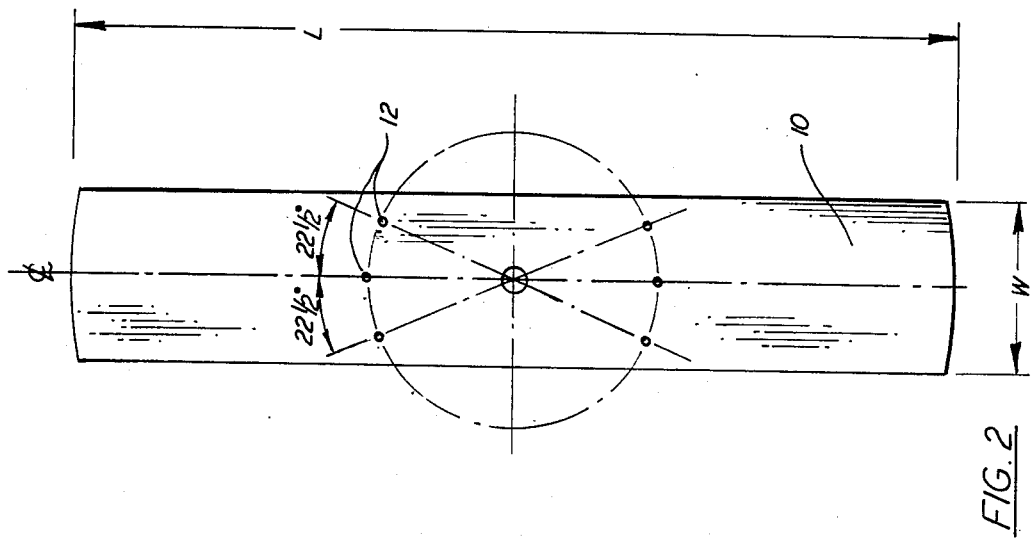
FIG. 2 is a plan view of one of the leaves of the array of FIG. 1.
Figure 1:
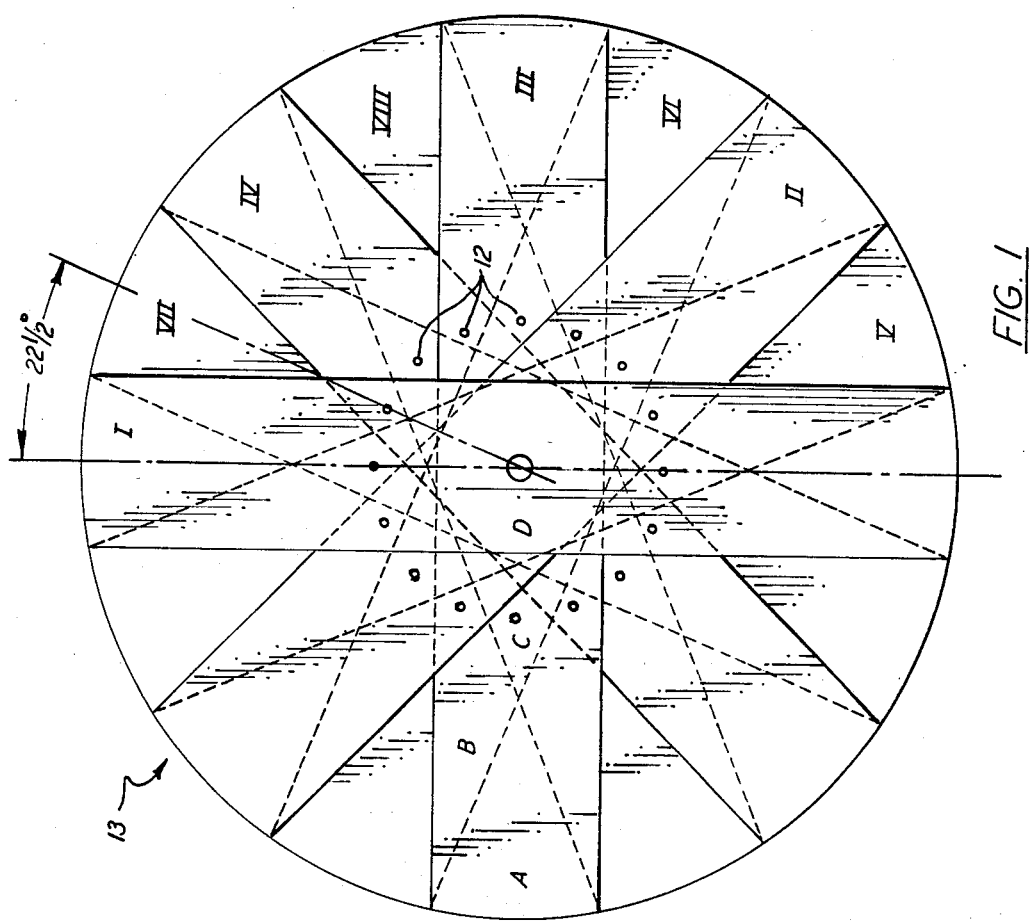
FIG. 1 is a plan view of an array of leaves in accordance with the invention.

In the preferred embodiment of FIGS. 1 and 2, eight elongated leaves 10 of equal thickness are utilized, bearing the respective numerals I to VIII in FIG. 1. It is preferable that the leaves be flat initially though they may be slightly bowed if desired. They may be of sheet metal, perhaps of stainless steel or aluminum in the order of 0.010 inch (0.254 mm.) thickness either of single ply or laminated. One of these leaves 10 is shown in FIG. 2. Each leaf 10 has a central hole 11 at its midpoint to receive any suitable handling tool and six assembly holes 12 arranged in sets of three equidistantly from the central hole 11 as shown in FIG. 2. In each set of assembly holes 12, one is on the centerline of the leaf and two are arranged $22\frac{1}{2}$ degrees to each side thereof, all on a common circle, The diameter of that circle is substantially less than half the length of a given leaf 10; for example, if the length of one leaf is $23\frac{5}{8}$ inches (60.0 cm.), the diameter of the circle of holes 12 may be $7\frac{5}{8}$ inches (19.4 cm.). The number of holes and their position on the circle, as well as the diameter of that circle are all appropriate to the number of leaves, in this case eight. Beyond that circle the leaves are free to bend with respect to one another, a movement which involves relative sliding motion between overlapping leaves.

The eight leaves 10 are co-joined by means of suitable fasteners extending through the holes 12 in an overlapping fanned array 13 of equal angular spacing of $22\frac{1}{2}$ degrees as shown in FIG. 1. The opposite ends of the leaves are arcuate in the embodiment shown in FIGS. 1 and 2 conforming to a circle of a diameter equal to the length of each leaf. In order that the leaves form a total circle when their corners are congruent as shown in FIG. 1, the width of each leaf is substantially equal to Pi times the length divided by twice the number of leaves. Alternatively the ends of the leaves may be straight and their two opposite corners then are congruent with such a circle so that the two corners contact and grip the cylindrical body. Yet another variation is that ends of the leaves may be defined by two flats joined in an obtuse angle at the leaf centerline with the opposite corners and the central point when they are joined all being congruent with such circle. This segmented form provides three points of purchase where each leaf end contacts and grips the cylindrical body.

The sequence of assembly for the embodiment of FIGS. 1 and 2 is indicated by the Roman numerals shown in FIG. 1. In other words leaf I is directly on top of II which is directly on top of III and so on to the bottommost leaf VIII. With the various holes 12 aligned and fasteners inserted therethrough the array 13 is as shown in FIG. 1 with the corners congruent and a complete circle formed. The number of leaves can vary but it is normally preferred that they be not less than four and not more than sixteen in total.

The array 13 of leaves 10 is adapted to be forced into a cylindrical body transversely and coaxially therewithin and deformed into a concavo-convex domed partition resistant to axial displacement from forces acting on its convex side. Those portions of the leaves outside the circle of holes 12 slide together slightly in the manner of a closing fan as this takes place. As noted previously the thickness of the array of leaves varies from a minimum at its periphery through concentrically symmetrical increases to a maximum at its center. Thus at A in FIG. 1 the thickness equals that of leaf III alone, at B the sum of III and VI, at C that sum plus VIII, and so on in symmetrical polygonal overlapping areas, until at the center D its thickness is the total of all eight leaves. The result is a disc which is reinforced at its center and is most flexible at its periphery which is the most effective design for purposes of being wedged in concavo-convex form in a cylindrical body to resist displacement forces on its convex face.

Figure 3:
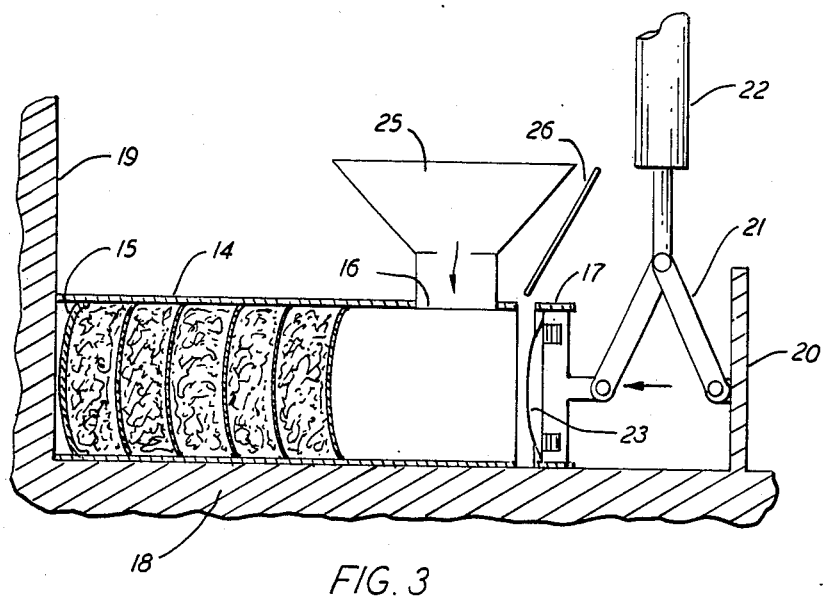
FIG. 3 is a sectional elevation of a compacting device utilizing the partition of the invention.

One form of cylindrical body is shown as a container 14 in FIG. 3 having a fixed end wall 15 closing one end. An aperture 16 is provided on one side of the container 14 adjacent an open end opposite the end wall 15. A short guide cylinder 17 is provided opposite the open end of the container 14. The guide cylinder 17 is fixed to a base 18. The container 14 rests on the base 18 with its closed end wall 15 against an abutment 19. Opposite the open end of the container 14 and guide cylinder 17 is another abutment 20. By means of a toggle 21 operated by a piston 22 a domed plunger 23 is adapted to be forced axially from the cylinder 17 into the open end of the container 14 through a relatively short stroke. Compressible contents are inserted into the container 16 through a guide hopper 25. One initially flat partition 26 formed of an array 13 of leaves 10 in accordance witht he invention is lowered over the domed end of the plunger 23 and the piston 22 is extended to flatten the toggle 21 and push the partition 26 into the container 14 and displace the contents toward the end wall 15. More compressible contents are inserted through the guide 25 and another partition 26 is inserted. This is repeated until one after another a series of the partitions 26 as shown in FIG. 3 are forced into the container compressing their respective quantities of contents therebetween.

As each partition 26 is inserted and pushed forward into the container its diameter is contracted and the leaves of which it is constructed bend into a concavo-convex form. If the ends of the leaves are arcuate as shown in FIGS. 1 and 2 they conform substantially to the inside shape of the container 14 throughout their length. If they are straight, as they may be, only the corners of the bent leaves contact the inside of the container 14. In any event when formed into concavo-convex shape the leaves comprise a resilient transverse partition which is wedged into position by the forces acting on the convex side thereof, namely the tendency of the compressible contents to expand.

Since the bending radius of each of the domed partitions 26 is relatively large compared to the inside diameter of the container 14, the displacement forces againt the convex side are converted to very high thrust loads against the walls of the container which translate into hoop stress at the point where the partition contacts the wall of the container. The higher the restoring or spring-back force of the compacted material, the greater the thrust force against the walls, thus causing friction to be a highly effective factor in preventing any motion of the partition away from its implaced position at full compaction pressure. Compaction devices utilizing the domed partition of the invention may be small domestic units for household trash, in which case they may perhaps be hand-operated rather than powered by means of a hydraulic boosted piston, or they may be of large commercial size, used for example in so-called packer-type garbage trucks. The invention is also applicable to the packaging of compressible products such as synthetic fibers, foam or sponge materials and the like.

Figure 4:
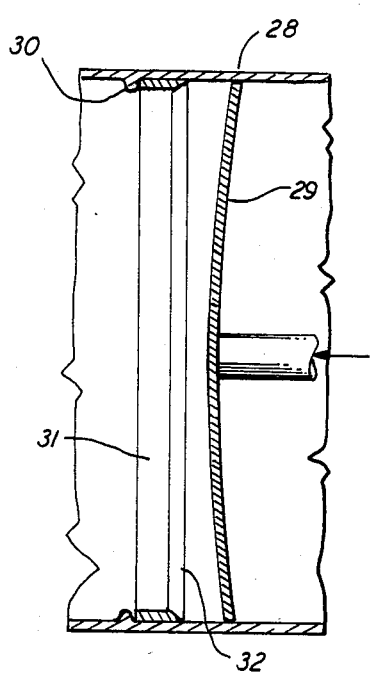
FIG. 4 is a fragmentary longitudinal section of a cylindrical body with an insert ring form of removal means for the partition and illustrating an initial position of the ring.
Figure 5:
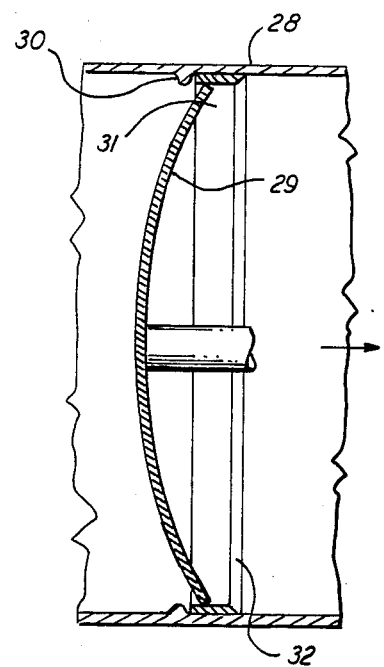
FIG. 5 is a section similar to FIG. 4 showing the partition within the insert ring and ready for removal.

Simple means for removing one of the domed partitions of the invention from within its cylindrical body is illustrated in FIGS. 4 and 5. A cylindrical body 28 is equipped with a domed partition 29 formed of an array of leaves as described previously. An annular jamb 30 of smaller insider diameter than that of the body 28 is formed about the interior of the body. It may be an inwardly extending boss integral with the cylinder wall as indicated in FIGS. 4 and 5 or it may be a separate retention ring affixed to the cylindrical body wall. Slip-fitted into the body 28 from the right is an insert ring 31 of slightly less diameter than the body 28 which abuts the jamb 30 and can move no further to the left than the position shown in FIG. 4. The righthand edge of the insert ring 31 opposite the jamb 30 may have a bevelled edge 32 as shown.

The domed partition 29 is displacable toward the insert ring 31 from any given locked position. If it is desired to remove the domed partition 29 it is simply pushed forwardly, to the left as shown in FIG. 4, so that the periphery of its array of leaves slides over the bevelled edge 32 and the partition 29 is brought to rest within the insert ring 31 as shown in FIG. 5. Displacement of the array of leaves axially in the direction of its convex side into the insert ring 31 causes the diameter of the domed partition 29 to contract out of contact with the cylindrical body 28. Any suitable means may be provided for removing the insert ring 31 witht he contracted partition 29 therewithin from the body in a direction away from the jamb 30 to the right as shown in FIG. 5. When the insert ring with the partition 29 therewithin is outside the body 28 it may be pushed forwardly out of the ring 31 and separated therefrom.

With respect to FIGS. 6 to 8, an inflatable pipeline seal assembly is shown utilizing the domed partition of the invention. Temporary seals of this sort find may uses, as for example in nuclear reactors when pressure tests are to be made on pipelines during periods of shutdown. When a fluid tight seal is created for the pressure test it must be fixed in its place within the pipeline so that it cannot be displaced by the testing pressure, and this affixing function is carried out by the domed partition of the invention.

Referring first to FIGS. 6 and 7 a pipeline 35 is fitted with a temporary seal assembly which includes a rigid sealing plate 36 having a conventional pneumatically inflatable peripheral sealing ring 37. Radially spaced support ribs 38 extend from the low-pressure side of the sealing plate 36 and an annular support plate 40 is mounted on the ribs 38. A domed partition 41 is secured coaxially to the support plate 40 and it is of the multi-leaf form described in reference to FIGS. 1 and 2. As shown in FIG. 6 the periphery of the partition 41 is adapted to contact the inside of the pipeline 35 and be wedged in place against forces exerted on the convex side thereof, which is to say fluid pressure acting in a direction to the right as shown in FIG. 6. This wedging effect prevents the sealing plate 36 with its annular pneumatic sealing ring 37 from being displaced during the pressure test.

When the test is completed, it is necessary to remove the assembly to the right as seen in FIG. 6 and for this purpose a form of withdrawal means is provided. This includes a bending ring 42 of slightly lesser diameter than the domed partition 41 and disposed coaxially on the assembly of the convex side of the partition. The bending ring 42 has an inner annular groove 43 in which ends 44 of a radial array of actuating arms 45, perhaps six in number, are disposed. Each actuating arm 45 is pivotable about a trunnion 46 on the support plate 40.

An inner end 47 of each actuating arm 45 remote from the end 44 that engages the bending ring 42 is disposed within an external annular groove 48 at one end of an axial plunger 49. The plunger is movable within the support plate 40 and within a hub 50 attached to the support plate 40 and extending from the concave side of the partition 41. The plunger 49 is biased to the right as shown in FIG. 6 by a compression spring 51 acting between the right end of the hub 50 and a flange 52 on the outer end portion of the plunger 49. Extending from the flange 52 of the plunger 49 to the right as shown in FIG. 6 is a knob 53.

When a pressure test is completed the pneumatic sealing ring 37 is deflated and the pipeline seal assembly is to be removed. In order to release the domed partition 41 from its wedged position within the pipeline 35, a grapple tool as shown in FIG. 8 is inserted into engagement with the assembly. The tool consists of a central push rod 55 slideable within a cylindrical housing 56 which in turn is enclosed within an outer cylinder 57. At the end of the cylinder 57 is affixed a bell shaped end member 58. The cylindrical housing 56 extends slideably into the bell shaped member 58 and has pivoted thereto on trunnions 59 and 60 a pair of grapple arms 61 and 62. The outer ends of the arms are notched at 63 and 64 and the inner ends thereof comprise levers 66 and 67 which are pivoted by annular lands 68 and 69 on the inside of the bell shaped end member 58.

To open the grapple assembly the outer cylinder 57 is pulled to the right as seen in FIG. 8 causing the lands 68 and 69 to turn the levers 66 and 67 inwardly and thus spread the grapple arms 61 and 62. Movement of the cylinder 57 to the left as shown in FIG. 8 causes the arms 61 and 62 to close. Thus this back-and-forth push-pull movement of the outer cylinder 57 causes the notches 63 and 64 of the grapple arms 61 and 62 to latch or unlatch from the flanged end of the hub 50 of the assembly. In order to operate the bending ring withdrawal means, the grapple is latched onto the hub 50 as shown in FIG. 8 and the inner push rod 55 is forced to the left as shown therein. Its end contacts the knob 53 and pushes the plunger 49 to the left against the force of the compression spring 51. This turns outer ends 44 of the actuating arms 45 to the right as seen in FIG. 6 and causes the bending ring 47 to move toward the convex side of the partition 41. The righthand edge of the bending ring 42 then contacts the array of leaves comprising the partition 41 and causes them to further deform and contract in diameter out of contact with the pipeline 35. This releases the pipeline seal assembly and permits it to be removed with the contracted array of leaves held by the bending ring 42.

The scope of the present invention is defined by the following claims rather than the foregoing description of preferred embodiments thereof.

I claim:

1. A resilient transverse partition in combination with a substantially cylindrical body comprising
   (a) a plurality of narrow elongated leaves of thin resilient material of equal length initially co-joined in an overalpping fanned array about a common center with their opposite ends slideable with respect to one another and congruent with a circle of slightly greater diameter than that of said body,
   (b) said array of leaves being forced into said body transversely to and coaxially therewithin and deformed into a concavo-convex domed partition of a relatively large radius compared to that of the cylindrical body and hence wedged in place to be resistant to axial displacement from forces acting on its convex side.

2. A partition according to claim 1 wherein the leaves are fanned apart with equal angular spacing therebetween and the thickness of the array increases with concentric symmetry from a minimum at its periphery to a maximum at its center.

3. A partition according to claim 1 wherein the corners of the ends of the leaves are substantially congruent with said circle.

4. A partition according to claim 3 wherein a central point of each leaf end is also substantially congruent with said circle.

5. A partition according to claim 1 wherein each leaf has a width substantially equal to Pi times its length divided by twice the number of leaves.

6. A partition according to claim 1 wherein the opposite ends of each of the leaves are arcuate and conform substantially to and contact the cylindrical body throughout their length.

7. A partition according to claim 1 wherein the leaves are slideable with respect to one another except at a relatively small central portion of the array.

8. A partition according to claim 1 wherein the array is initially flat before being forced into said body.

9. A partition according to claim 1 further including withdrawal means for contracting the diameter of the concavo-convex domed partition to permit its removal from the cylindrical body.

10. A resilient transverse partition according to claim 9 in combination with said substantially cylindrical body and wherein said withdrawal means comprises
    (a) a bending ring of slightly lesser diameter than the concavo-convex partition disposed coaxially within said body on the convex side of the array,
    (b) linkage means remotely operable from outside said body for forcing said bending ring axially against the convex side of the array to further deform said leaves and contract the diameter of the domed partition out of contact with said body, and
    (c) means for removing the bending ring and contracted array of leaves from the body.

11. A resilient transverse partition in combination with a substantially cylindrical body comprising
    (a) a plurality of initially flat elongated sheet metal leaves co-joined in an overlapping fanned array of equal angular spacing and each having a length slightly greater than the body diameter and a width substantially equal to Pi times the length divided by twice the number of leaves, (b) the thickness of the array increasing with concentric symmetry from a minimum at its periphery to a maximum at its center, (c) the leaves being slideable with respect to one another except at a central portion of the array, (d) said array being force-fitted coaxially within said body transverse thereto and resiliently deformed into a concavo-convex domed partition of a relatively large radius compared to that of the cylindrical body and hence wedged in place to be resistant to axial displacement from forces acting on its convex side.

12. The combination according to claim 11 further in combination with a domed plunger for force-fitting the array into the body.

13. A combination according to claim 11 further including withdrawal means comprising
   (a) a bending ring of slightly lesser diameter than the concavo-convex partition disposed coaxially within said body on the convex side of the array.
   (b) linkage means remotely operable from outside said body for forcing said bending ring axially against the convex side of the array to further deform said leaves and contract the diameter of the domed partition out of contact with said body, and
   (c) means for removing the bending ring and contracted array of leaves from the body.

14. A combination according to claim 11 wherein the cylindrical body is closed-end container adapted to receive compressible contents and the domed partition is forced into place with its convex side adapted to compress the contents within the container.

15. A combination according to claim 11 wherein the cylindrical body is a pipe and the domed partition is a portion of temporary sealing means for resisting fluid pressure on the convex side thereof.

16. A resilient transverse partition in combination with a substantially cylindrical body comprising
   (a) a plurality of narrow elongated leaves of thin resilient material of equal length initially co-joined in an overlappng fanned array about a common center with their opposite ends slideable with respect to one another and congruent with a circle of slightly greater diameter than that of said body;
   (b) said array of leaves being forced into said body transversely to and coaxially therewithin and deformed into a concavo-convex domed partition resistant to axial displacement from forces acting on its convex side; and
   (c) withdrawal means for contracting the diameter of the concavo-convex domed partition to permit its removal from the cylindrical body comprising
      (i) an insert ring of slightly lesser diameter than said body disposed coaxially therewithin on the convex side of the array of leaves,
      (ii) jamb means for preventing axial movement of said insert ring in a direction away from the convex side of the array of leaves,
      (iii) displacement means for forcing said array of leaves axially in the direction of its convex side into the insert ring thereby contracting the diameter of the domed partition out of contact with said body, and
      (iv) means for removing the insert ring with the contracted array of leaved therewithin from the body in a direction away from the jamb means.

17. A combination according to claim 16 wherein the displacement means is a domed plunger.

* * * * *